Figure 5:
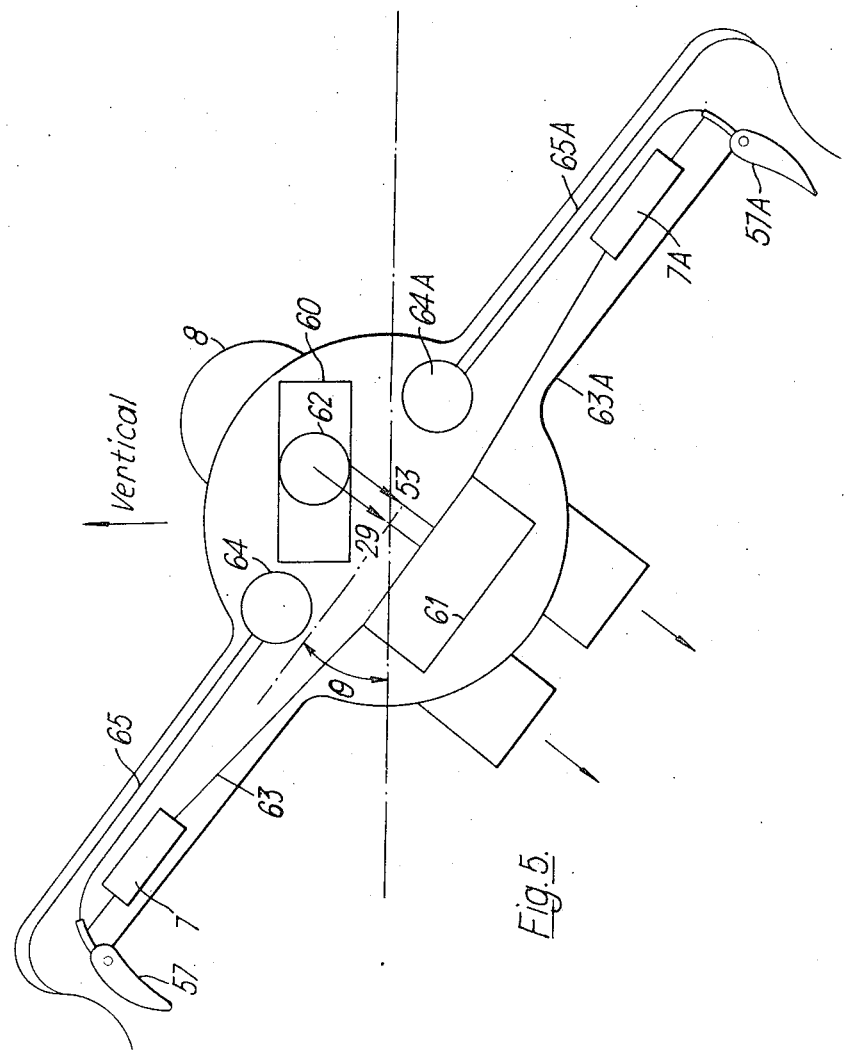

United States Patent [19]
Johnson

[11] 3,816,715
[45] June 11, 1974

[54] CONTROL SYSTEMS
[75] Inventor: Christopher Linley Johnson, Hartshorne near Burton-on-Trent, England
[73] Assignee: Rolls-Royce (1971) Limited, London, England
[22] Filed: Nov. 10, 1972
[21] Appl. No.: 305,288

[30] Foreign Application Priority Data
Nov. 17, 1971 Great Britain..................... 53335/71

[52] U.S. Cl................ 235/150.1, 244/77 R, 244/12
[51] Int. Cl. ........................................... G05b 13/02
[58] Field of Search.................................. 235/150.1

[56] References Cited
UNITED STATES PATENTS
3,480,765  11/1969  Rouxel et al..................... 235/150.1

OTHER PUBLICATIONS
"Learning Systems for Automatic Control", IREE Transactions on Automatic Control, Vol. 11, No. 1, Jan. 1966, by Jack Sklansky, pp. 6–9. TJ–212

Primary Examiner—Eugene G. Botz
Attorney, Agent, or Firm—Cushman, Darby & Cushman

[57] ABSTRACT

A control system for producing an output signal which is proportional to a input signal comprises two operating circuits each having a different rate of response on receiving an input signal. A switch is provided for switching one or both of the operating circuits into operation. The switch is controlled by control means which is in turn controlled by means for detecting an error between the input signal and the corresponding output signal. The control means controls a switch in accordance with the value of the input signal, the output signal or the error whereby the error is maintained at a minimum value.

9 Claims, 6 Drawing Figures

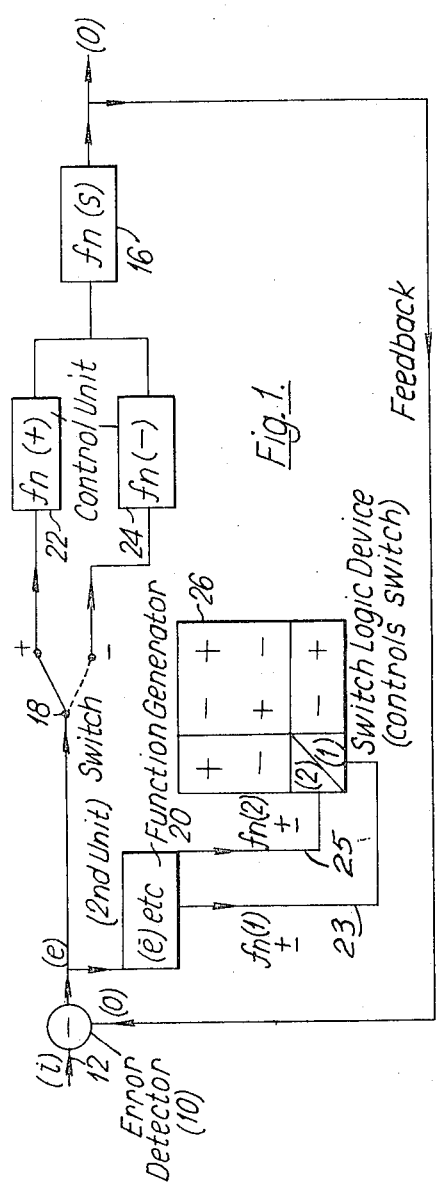
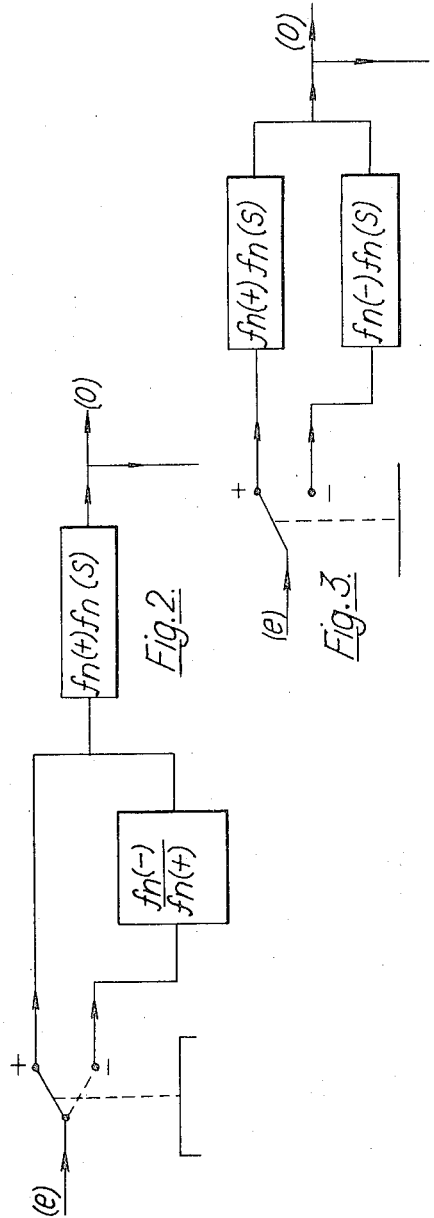

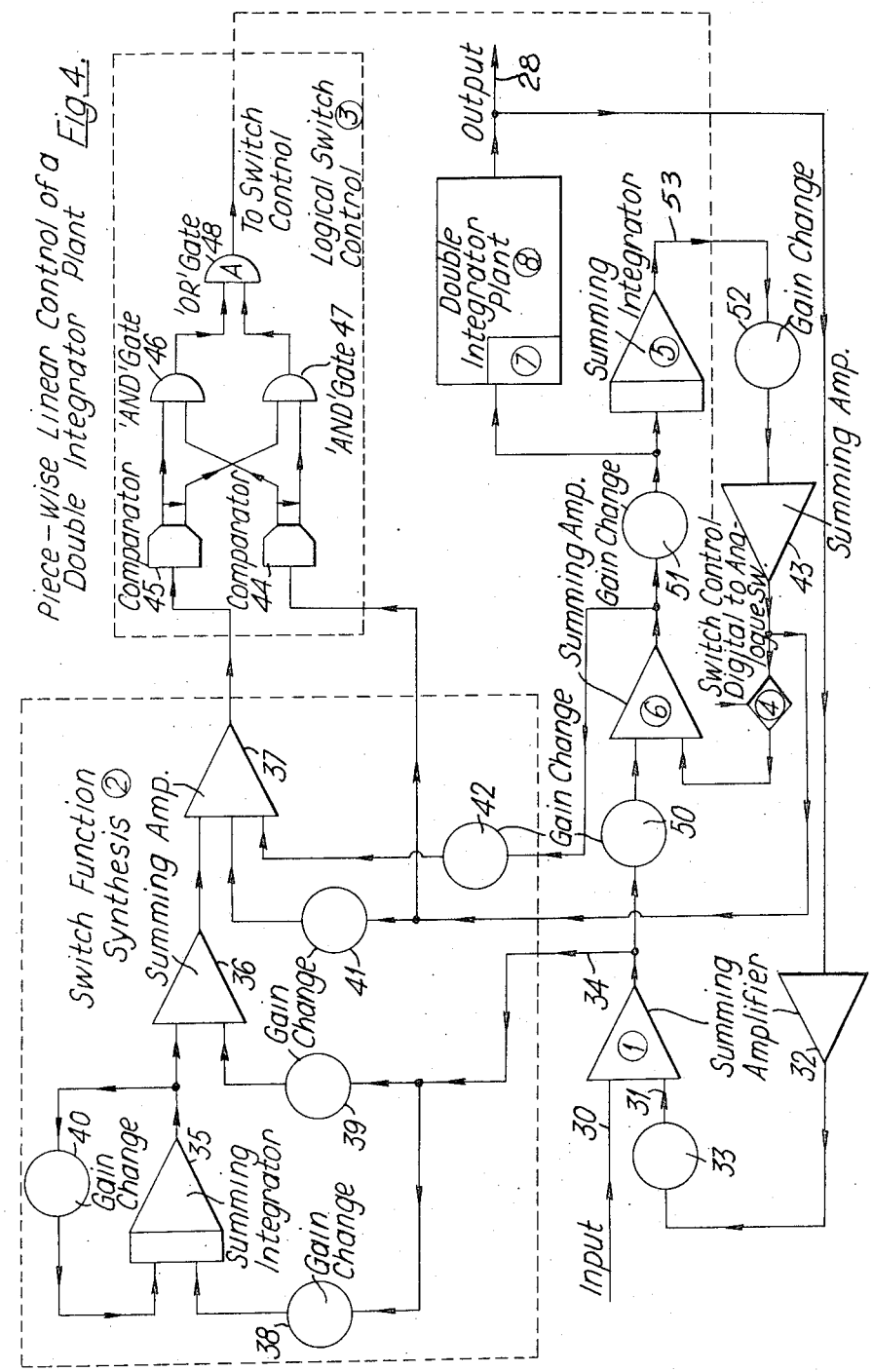

CONTROL SYSTEMS

This invention relates to control systems and is particularly concerned with a control system for a plant in which rapid adjustments are needed to maintain optimum performance of the plant and/or to prevent damage thereto. An object of the invention is to provide a control system which will substantially improve the performance of control systems beyond the possibilities of purely linear devices or known non-linear additions.

The applications in which improvements are most required are complex systems involving interactions between control computing elements, the hydromechanical "muscles," the power plant and perhaps a vehicle, e.g., gas turbine engines with reheat and/or supersonic intakes and helicopters with rotor speed governing.

Linear control systems or servo mechanisms are systems whose output may be described with sufficient accuracy by linear differential coefficients including derivatives of the varying input and output. Non-linear control systems cannot be so described. A particular property of linear systems is that if they are supplied with a continuous sinusoidal input, then after initial disturbances have died away, the output is sinusoidal at the same frequency but usually of different amplitude and phase. A more general property is that if the input to a linear system is increased in a given ratio then the output is increased in the same ratio, i.e., they are not "amplitude sensitive." All non-linear systems lack said particular property by definition and most known non-linear systems lack said general property.

Known examples of amplitude sensitive non-linear systems may differ from linear systems by lack of response to small input amplitudes owing to friction or backlash or to large amplitudes owing to their reaching the maximum rate of response of some component called "saturation." These types of response may be inherent in some devices but are not usually advantageous. Known non-linear methods of control which achieve some useful results include systems whose rate of response increase abruptly for large errors and adaptive systems which include devices which predict the best moment to apply full corrective power. The former have minor effects and are almost always unsatisfactory near the boundary where the rapid response just comes in, whilst the latter either produce violent correction for small errors or adapt too slowly so that damage can occur.

A typical plant which is very difficult to control by conventional linear methods is a plant known as a double integrator.

An example is a gas turbine engine reheat nozzle control having a pressure ratio measuring device with an output from a hydraulic jack whose velocity of movement is proportional to the error from the desired pressure ratio, this constituting the first integrator. The jack varies the stroke of an hydraulic plunger pump feeding fluid to further jacks which move the reheat nozzle flaps at a velocity proportional to the flow from the plunger pump. This forms the second integrator assuming the measured pressure ratio to be functionally dependent upon the nozzle flap position.

As described this system would be unstable and the normal practice in the present state of the art is to introduce position feedback to convert one of the integrators into a proportional control device, for example, by fitting a feedback link which modifies the apparent pressure ratio error of the pressure ratio device in proportion to the departure from the balance position. Alternatively the nozzle jack can be made proportional by combining the movement of the pressure ratio jack with that of a feedback link from the nozzle position, and controlling the pump stroke with the resultant.

An object of the present invention is to retain the said general property of linear systems of insensitivity to input amplitude so that if the response is optimal at any amplitude it will be at other amplitudes and the system will not make violent correction for small errors.

According to an aspect of the present invention a control system for producing an output signal which is substantially proportional to an input signal comprises at least two operating circuits each having a different rate of response on receiving an input signal, switching means for switching one or more of said circuits into operation to receive an input signal, control means for controlling said switching means, means for detecting an error between an input signal and the corresponding output signal, said control means controlling the switching means in accordance with the value of the input signal, the output signal or the error whereby the error is maintained at a minimum value.

Preferably the switching means is controlled by the control means in accordance with the sign of two or more functions which are linear combinations of the input signal, the output signal, the error and their derivatives.

The term "derivatives" herein is used in the sense of the Differential Calculus i.e., it means the same as differential coefficients.

At least one of the operating circuits may be unstable or marginally unstable when in operation.

Preferably there are two operating circuits.

The switching means may be adapted to switch only one of the operating circuits into operation to receive an input signal at a time or may be adapted to switch one or both operating circuits into operation to receive an input signal at a time.

Preferably the control system comprises two operating circuits, the first when switched into operation having an inherently fast (and possibly unstable) response to an input signal, and the second when switched into operation being adapted to cause a rapid reversal of the response of the first operating circuit so as to dissipate at least a portion of the energy generated in the fast response. The control system is preferably arranged such that when the error is reducing it is reduced as rapidly as possible and the response of the particular operating circuit switched into operation is checked at a predetermined time by the control means causing the other operating circuit to be switched into operation to minimise an overshoot.

By this means a more rapid response with given limitations such as a given maximum acceleration and deceleration can be obtained than with a single linear control mode with the same limitations.

The invention is applicable to operating circuits which are "piecewise" linear, i.e., the operating circuits operate as linear systems between switch points, but is not restricted thereto.

Further aspects of the invention will become apparent from the following description of embodiments of the invention described by way of example only with reference to the accompanying drawings in which FIGS. 1 to 3 are schematic diagrams indicating the basic components of a control system in accordance with the invention. These figures do not represent different systems but are merely different ways of drawing the same system and they are mathematically equivalent.

FIGS. 2 and 3 only show engine control parts of the system, the switch part being common to the three figures.

Figure 6:
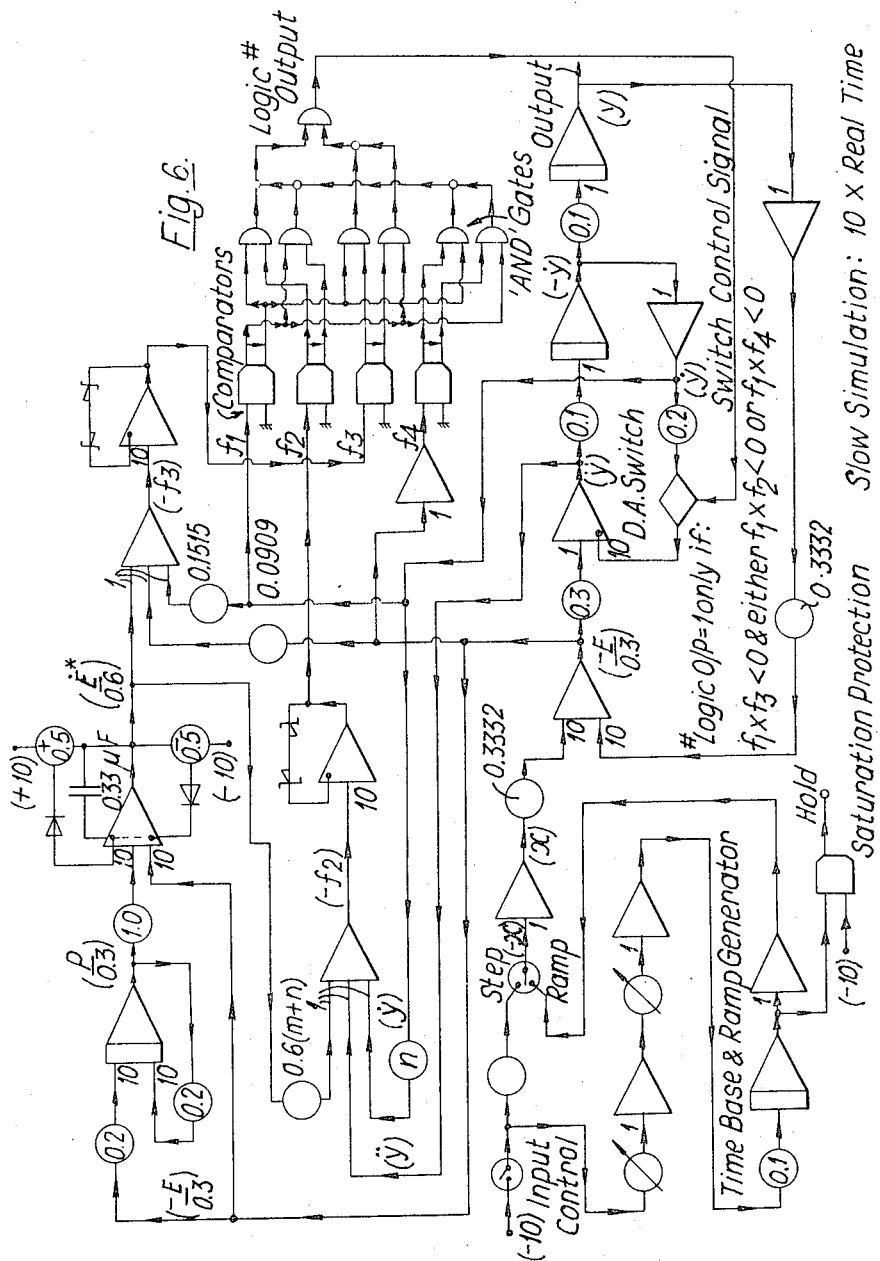

FIG. 4 shows a circuit for a control system according to the invention as applied to a double integrator type plant, FIG. 5 shows a diagrammatic front view of an aircraft incorporating a control system in accordance with the invention and FIG. 6 shows a modified form of the circuit shown in FIG. 4.

In FIGS. 1, 2 and 3 is illustrated a closed loop control system. In FIG. 1, the common block 16 represents the transfer function of the output actuator plus engine or plant being controlled. If $fn\,(+) = +1$ then FIGS. 1 and 2 become identical. FIG. 3 best represents the procedure used in computing the performance of the system.

The figure shows a closed loop control system of the kind known in the art in which the output from the system is compared with the input and the error is amplified and used to modify the output in a manner that is intended to reduce the error.

The input to the control system is fed into an error detector 10, through the line 12, the error detector also being fed by an output signal through the line 14 from the plant 16 being controlled.

The error detector is connected to a switch 18 and a function generator 20 arranged in parallel. The switch has two positions and is adapted to feed the error to one of two control units 22 or 24 according to its position. The two control units are connected to the plant 16 which produce a final output intended to follow the input and which is fed back to the error detector 10 through the line 14 to determine the error.

The function generator 20 computes from the error signal two or more functions $fn\,(1)\,fn\,(2)$ etc, which are linear combinations of the error signal and its derivatives and feeds these functions through lines 23, 25 to a switch logic device 26 which determines the position of the switch 18.

The switch logic device 26 consists of a set of components which detect the signs of the functions $fn\,(1), fn\,(2)$ etc and determine the sign of the output from said logic device according to the combination of the signs of the inputs to the switch logic devic 26 and control the switch 18 positions in accordance with this output. The table representing the behaviour of the switch logic device 26 has the same form as the Truth Tables used in modern logical theory.

The equation $fn\,(1) = 0, fn\,(2) = 0$ etc define conditions at which switching takes place.

FIG. 4 shows a control system according to the invention as applied to a double integrator type plant.

The system consists of eight basic components as follows:

1. An error detector which compares the input with the output which is fed back as in all existing closed loop control systems by definition.

2. A function generator which computes two or more functions of the error and output and their derivatives and transmits the results in the form of digital pulses to 3. A logical switch control or arrangement of comparators and gates which compares the functions and controls a switch 4 in accordance with the result of the comparison.

4. The switch which when closed allows a signal to pass representing the required damping term generated by:

5. An integrator which computes the rate of change of plant 8 output. Alternatively, said rate of change may be measured at a convenient place in the plant 8.

6. A summing amplifier which combines the damping term with the error in the required proportions when the switch is on and merely passes on a signal representing the error when the switch is off.

7. An actuator or converter which converts the control signal into a suitable form for controlling the plant 8, e.g. fuel flow, jack velocity or position, motor voltage, flow of chemical etc.

8. The plant whose response to the control signal may be expressed substantially by a transfer function equation corresponding to a double integral, or a similar function which is difficult to control stably.

The error detector consists of a summing amplifier and is fed with the input through line 30 and an output signal from the line 31. The output signal is derived from the plant 8 and is fed through an amplifier 32 and a gain changer 33 before being fed into the summing amplifier 1. The output from the error detector 1 is fed to the summing amplifier 6 and along line 34 to the function generator 2.

The function generator 2 consists of a summing integrator 35 and two summing amplifiers 36 and 37. The output from the error detector is fed along line 34 through a gain changer 38 into the summing integrator 35 and through a gain changer 39 into the summing amplifier 36. The output from the summing integrator 35 is fed back through a gain changer 40 and into the summing amplifier 36. This arrangement is well known in the art and is such that the output from the amplifier 36 is an approximate differentiation of the input along line 34 i.e., the error detected by the summing amplifier 1.

The output from the summing amplifier 36 is fed into summing amplifier 37 together with two further signals, one from the output of the summing amplifier 6 through a gain changer 42 which represents the input to the plant and therefore represents the second differential of the output 28 of the plant, and the other from the output from an amplifier 43 through a gain changer 41 which is fed by integrator 5 through a line 53 and a gain changer 52 and which represents the first differential of the plant output.

The output from the summing amplifier 37 is therefore a linear combination of these three inputs, forming the switch function f2.

The output from the summing amplifier 37 and a further signal from the amplifier 43 are fed to the logical switch control 3. The latter signal represents the first differential of the plant output and forms the switch function f1. The logical switch control 3 consists of two comparators 44 and 45, two AND gates 46 and 47 and an OR gate 48.

The output from the summing amplifier 37 is fed to the comparator 45 which detects whether it is positive or negative. If it is positive a signal of fixed level is fed to AND gate 46 and if it is negative a similar signal is fed to AND gate 47. Similarly if the output f1 from the amplifier 43 is positive a signal is fed to AND gate 46, and if said output is negative the signal is fed to AND gate 47.

If there are two signals to the AND gate 46 there will be an output to OR gate 48 and if there are two signals to the AND gate 47 there will also be an output to said OR gate 48. If there is only one signal to each AND gate there will be no output.

If there is no output to the OR gate it will produce an output to switch off the digital-to-analogue switch 4. If there is no output the switch will be on. Normally an OR gate will also give an output if it receives two inputs, but this should never happen with the arrangement described. If there is any danger of two inputs occuring it would be possible to fit a warning device, not shown, to indicate that the logical switch control 3 is faulty.

The output from the summing amplifier 6 is fed to the summing amplifier 37 as mentioned hereinbefore, and to a gain changer 51. The output from the gain changer 51 is fed to the actuator and into the summing integrator 5. The output from the summing integrator 5 is fed via a gain changer 52 to an amplifier 43 whose output is fed to the digital - to - analogue switch 4. The output from the amplifier 43 is also fed into the summing amplifier 37 forming part of the function generator 2 as mentioned earlier. The output from the switch 4 is fed into the summing amplifier 6. The circuit thus has two operating circuits: the first when the switch 4 is off in which the signal from the summing amplifier 1 passes to the gain changer 50, the summing amplifier 6 and gain changer 51 to the actuator 7. This is a high speed response or rapid accelerating mode. The second operating circuit is when the switch 4 is on. This connects the circuit comprising the summing integrator 5, gain changer 52 and the amplifier 43 to the summing amplifier 6 and allows a damping term to be introduced generated by the summing integrator 5. This mode of operation therefore introduces deceleration forces into the signal supplied to the plant.

The control system thus is switched between the two operating circuits depending upon the error between the input and the output and the derivatives of the error between the input and the output and the derivatives of the input and the output.

Some of the components shown may be mechanical or hydraulic, but it is anticipated that the function generator 2 and the logical switch control 3 will comprise electronic components.

Although a control system having only two operating circuits has been described there are advantages in obtaining more accurate control for varying types of input in systems using three or four switch functions with a corresponding increase in the number of comparators and gates in the logical switch control 3. A circuit including four switch functions is shown in FIG. 6, otherwise the operation of this circuit is as FIG. 4.

In FIG. 5 there is shown a diagrammatic front view of a VTOL aircraft which is controlled in roll, by air jets of puff pipes taking air which is bled from the engines of the aircraft to variable nozzles at the extremeties of the aircraft. This is a double integrator "plant" and is controlled by a control system in accordance with the invention. Where appropriate the same reference numbers are used as on FIG. 4.

The aircraft or "plant" 8 is provided with variable area nozzles 57, 57A operated by actuators 7, 7A in opposite directions such that the total bleed airflow through the nozzles remains substantially constant. The rate of operation of the actuators 7, 7A is assumed to be so rapid that it introduces negligible delay in producing the desired angular acceleration.

Assume that after a disturbance, such as a gust of wind, the aircraft 8 turn at an angle $\theta$ to the horizontal and it is desired to reduce this angle to zero. The angle $\theta$ is determined by the gyroscopically stablised platform 60 whose attitude if fixed in space and the angle $\theta$ then constitutes the output 28 which is transmitted along line 29 to the auto-pilot 61 which includes the components 1, 2, 3, 4 and 6 of the control shown in FIG. 4.

If desired a pick-off 62 may be provided which measures the angular velocity $\theta$ of the aircraft 8 relative to the platform 60 and transmits a signal along line 53. Alternatively, the angular velocity may be calculated by including integrator 5 in the auto-pilot 61.

The auto-pilot 61 computes the required correcting signal in accordance with the method described hereinbefore and transmits it to actuators 7, 7A through lines 63, 63A so as to move the actuators in equal and opposite directions and alter the areas of nozzles 57, 57A by equal and opposite amounts to produce the desired angular acceleration $\theta$ of the aircraft. The angular position of the aircraft is the second integral of the angular acceleration, and provided aerodynamic forces are negligible in the hovering condition a given change of area of the nozzle 57, 57A will produce a given angular acceleration $\theta$. To give this result the nozzles are supplied with bleed air from the engine or engines (not shown) via the bleed ducts 64, 64A and ducts 65, 65A at a substantially constant pressure.

The aircraft may be controlled in pitch or yaw by substantially similar mechanism.

For a VTOL aircraft controlled by varying the thrust of lift engines in outboard pods the response of the system will be more complicated than a double integral because the engine response will be slower than that of variable nozzles, but the same type of control can be used.

I claim:

1. A control system for producing an output signal which is substantially proportional to an input signal comprising at least two operating circuits each having a different rate of response and receiving an input signal, switching means for switching one or more of said circuits into operation to receive said input signal, control means for controlling said switching means, means for detecting an error between said input signal and the corresponding output signal, said control means being constructed in accordance with the known characteristics of a plant to compute two or more functions which are linear combinations of at least one of the input signal, the output signal, the error and their derivatives and to operate said switching means in accordance with combinations of the signs of said functions wherein the error is rapidly reduced to a minimum value and the development of errors of the opposite sign (i.e., overshoots) is checked.

2. A control system as claimed in claim 1 in which at least one of the operating circuits is unstable or marginally unstable when in operation because of zero or small damping.

3. A control system as claimed in claim 1 in which there are two operating circuits.

4. A control system as claimed in claim 3 in which the switching means is adapted to switch only one of the operating circuits into operation to receive an input signal at a time.

5. A control system as claimed in claim 3 in which the switching means is adapted to switch one or both operating circuits into operation to receive an input signal at a time.

6. A control system as claimed in claim 5 in which the first operating circuit, when switched into operation to receive an input signal has an inherently fast and possibly unstable response to the input signal because of zero or small damping, and the second operating circuit, when switched into operation to receive the input signal is adapted to cause rapid reversal of the response of the first operating circuit so as to dissipate at least a portion of the energy generated in the fast response.

7. A control system as claimed in claim 3 in which the response of the particular operating circuit switched into operation is checked at a predetermined time by the control means causing the other operating circuit to be switched into operation to minimise an overshoot.

8. A control system as claimed in claim 1 in which one or more of the operating circuits have non-linear responses to an input signal.

9. A control system as claimed in claim 8 in which one or more of the operating circuits have linear responses between switch points.

* * * * *